United States Patent [19]
Ancker-Johnson

[11] 3,899,430
[45] Aug. 12, 1975

[54] DETECTOR-MODULATOR FOR AN OPTICAL COMMUNICATIONS SYSTEM

[75] Inventor: Betsy Ancker-Johnson, Reston, Va.
[73] Assignee: The Boeing Company, Seattle, Wash.

[22] Filed: Oct. 15, 1973
[21] Appl. No.: 406,689

[52] U.S. Cl. ................ 250/199; 329/144; 332/7.51
[51] Int. Cl. ............................................. H04b 9/00
[58] Field of Search.................... 250/199, 344, 345; 179/15 BD, 15 AL; 329/144; 332/7.51; 317/235 N, 235 T

[56] References Cited

UNITED STATES PATENTS

| | | | |
|---|---|---|---|
| 3,247,765 | 4/1966 | Cocca et al. | 250/199 |
| 3,331,036 | 7/1967 | Colbow | 332/7.51 |
| 3,436,545 | 4/1969 | Richards et al. | 332/7.51 |
| 3,584,220 | 6/1971 | Nomura et al. | 250/199 |
| 3,652,858 | 3/1972 | Kinsel | 250/199 |

FOREIGN PATENTS OR APPLICATIONS

| | | | |
|---|---|---|---|
| 1,101,223 | 1/1968 | United Kingdom | 250/199 |

OTHER PUBLICATIONS

Applied Physics Letters, Vol. 16, No. 12, June 15, 1970, pp. 482–484.
Laser Receivers, Ross, pp. 131–133, pp. 174–177.

*Primary Examiner*—Robert L. Richardson
*Attorney, Agent, or Firm*—Christensen, O'Connor, Garrison & Havelka

[57] ABSTRACT

A closed-loop optical communications system which transmits a laser-originated optical carrier from a sending station. The optical carrier, preferably a carbon dioxide laser beam, is successively directed through a plurality of transceivers back to a receiver associated with the laser sending station. Each transceiver includes a block of semiconductor material, preferably p-type or n-type InSb, which is maintained at 77° K. Modulation on the optical carrier is detected by generation of a plasma in each transceiver block by multiphoton absorption. Only a very small fraction of the optical carrier (i.e., 2%) is absorbed in each block. The carrier is in turn modulated at each transceiver by free-hole absorption caused by application of an external applied field which results in an electron-hole plasma being produced in the block. A time-multiplexed system allows communication among the transceivers and the sending station and receiver.

10 Claims, 6 Drawing Figures

PATENTED AUG 12 1975 3,899,430

SHEET 1

DETECTOR-MODULATOR FOR AN OPTICAL COMMUNICATIONS SYSTEM

BACKGROUND OF THE INVENTION

The present invention relates to semiconductor devices, and more particularly to a circuit means including a semiconductor device which provides detection and modulation of coherent optical radiation in an optical communications system.

Communications systems have increasing need of higher information carrying capability and faster communication times, particularly with the advent of interplanetary communications. Systems using an optical carrier wave therefore seem attractive, inasmuch as the speed of propagotion of light is the theoretical limit for any carrier, and further, in that the information carrying capability of the optical carrier is greater than that of r.f. or microwave carriers due to its higher frequency.

Some of the optical communication systems that have been proposed include a tunable $CO_2$ (carbon dioxide) laser having an adjustable-frequency coherent light output which serves as a carrier wave. The coherent light output is in turn amplitude or frequency modulated with a desired signal. Detection and demodulation of the modulated carrier is made by a semiconductor detector, for example, an impurity semiconductor such as doped germanium or an alloy semiconductor such as mercury cadmium telluride.

Systems of this type have proved disadvantageous, primarily because of limitations on the operational capabilities of useful semiconductor modulators and detectors. The laser modulators, such as gallium arsenide (GaAs), and the detectors noted above, absorb excessive energy from the carrier. For two-way communications, the combined losses of separate detectors and demodulators makes these systems impractical.

In addition, the known semiconductor detectors and modulators are not fast enough to permit full utilization of the information carrying capability of an optical carrier.

It is therefore an object of this invention to provide, in a single semiconductor device, means for detecting and modulating a laser-originated coherent optical carrier.

It is further an object of this invention to provide an optical communications system using a laser originated coherent carrier in which the detector and modulator is capable of very fast response.

It is yet another object of this invention to provide such a communications system which allows for closed-loop communications between a plurality of physically separated stations by means of information transmitted on a single laser-originated coherent optical carrier.

The present invention provides a detector-modulator for an optical communications system comprising: a narrow energy-gap semiconductor means capable of producing an electron-hole plasma by multiphoton absorption in response to irradiation by a modulated coherent optical carrier having a predetermined wavelength, biasing circuit means for detecting excess conductivity in said semiconductor means resulting from said plasma to provide an ouput signal proportional to the modulation of said coherent optical carrier, and modulating voltage means to apply a modulating voltage across said semiconductor means in response to a modulating signal to accordingly create a second plasma in said semiconductor means which modulates said coherent optical carrier by free-hole absorption thereof.

BRIEF DESCRIPTION OF THE DRAWINGS

A better understanding of the present invention can be acquired by reading the ensuing specification in conjunction with the accompanying drawings, in which.

DESCRIPTION OF THE PREFERRED EMBODIMENT

Figure 1:
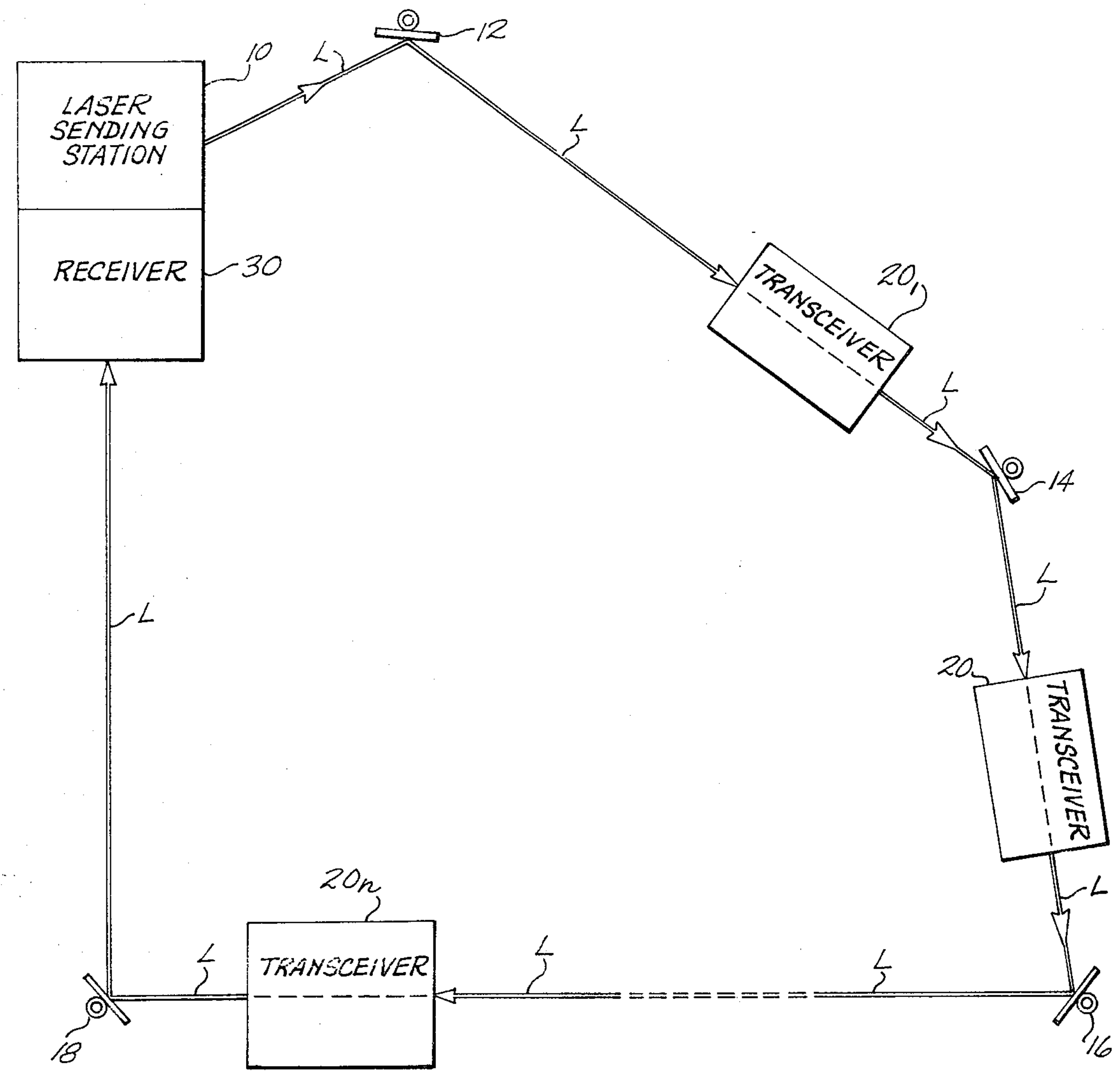
FIG. 1 is a block diagram of a closed-loop optical communications system including a laser sending station and a plurality of transceiver stations.

The present invention can perphaps be best understood by considering its application in a closed-loop communication system such as illustrated in FIG. 1. A laser sending station 10 provides a narrow output beam L of coherent light which has been modulated with an appropriate signal. The beam L is directed at a transceiver $\mathbf{20_1}$ by a first reflecting means 12 associated with laser sending station 10, which could comprise an adjustable, rotatable mirror. In transceiver $\mathbf{20_1}$, the modulated signal contained in beam L is detected, and the beam L is subsequently modulated with information obtained from an internal signal source within transceiver $\mathbf{20_1}$.

The beam L is then directed at a second transceiver $\mathbf{20_2}$ by a second reflecting means 14 associated with transceiver $\mathbf{20_1}$. In transceiver $\mathbf{20_2}$, the modulated signals provided by either laser sending station 10 or transceiver $\mathbf{20_1}$, or both, are detected and a further modulation is made upon the beam L with information from an internal signal source within transceiver $\mathbf{20_2}$. The beam L is then directed by a reflecting means 16 associated with transceiver $\mathbf{20_2}$ at a succeeding station in the system and finally is directed to a transceiver $\mathbf{20_n}$, where the modulation provided by any or all of the preceding stations $\mathbf{20_1}$, $\mathbf{20_2}$, etc., is detected, as is the modulation provided by laser sending station 10. A further modulation is made upon the beam L with information from an internal signal source within transceiver $\mathbf{20_n}$. The beam L is directed by a reflecting means 18 associated with transceiver $\mathbf{20_n}$ back to the laser sending station 10 and specifically to a receiver 30 associated therewith, where the modulated signals thereon are again detected. The operation of receiver 30 is coordinated with laser sending station 10 so that any or all of the information transmitted back to receiver 30 may again be broadcast by laser sending station 10.

In a system such as illustrated in FIG. 1, a communications cycle may be established which includes $n$ communication periods, where $n$ = the number of transceiver stations, by application of the principles of time multiplexing. As a result, each of the transceivers $20_1$, $20_2$ . . . $20_n$ has an assigned communications period within the communications cycle within which to communicate with the laser sending station 10 and receiver 30 and with the remaining stations in the system by modulation and detection of the optical beam L. Although the invention will be hereinafter described with respect to a particular multiplexing scheme, it will be obvious to those skilled in the art that other multiplexing schemes may be more suitable for other applications. For example, reflecting means 14 could include a beam splitter arrangement for directing a portion of the beam L back to laser sending station 10, and another portion to transceiver $20_2$. In such a case, a different multiplexing scheme would be used.

To explain the invention, reference will now be made to the specific embodiments of laser sending station 10, transceivers $20_1$, $20_2$ . . . $20_n$, and receiver 30 illustrated in FIGS. 2, 3 and 4, respectively, together with the timing diagram in FIG. 5.

Figure 2:
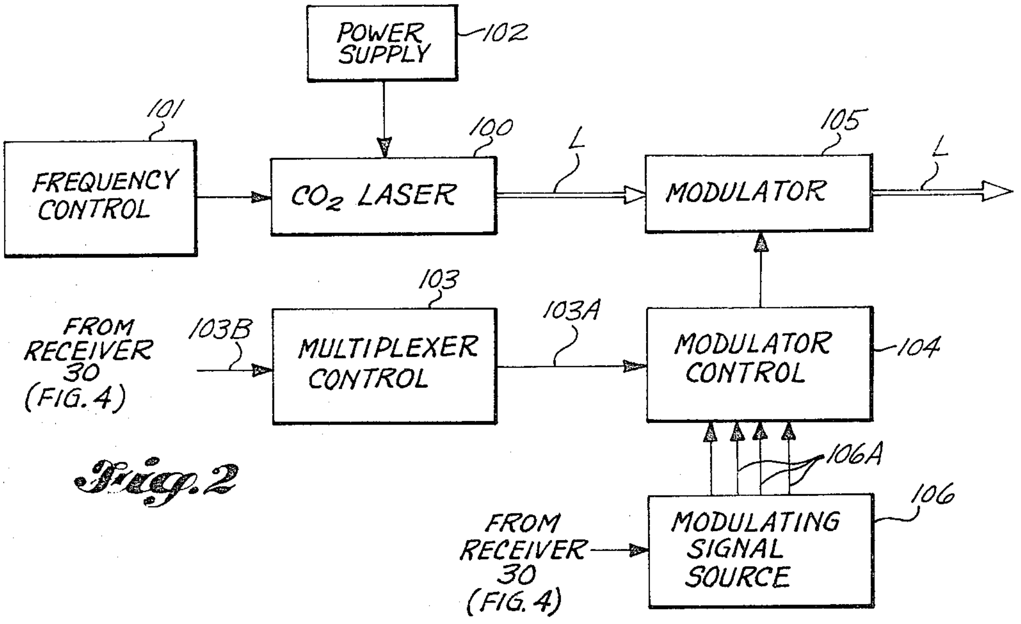
FIG. 2 is a block diagram of one embodiment of the laser sending station in FIG. 1 including means for generating a modulated coherent optical carrier.

In FIG. 2, a $CO_2$ laser 100 is excited by a high voltage power supply 102 to provide a narrow-beam coherent optical carrier. The frequency of operation of laser 100 may be adjusted by a frequency control 101. Typical operational wavelengths for the laser 100 would be 9.6 $\mu$m and 10.6 $\mu$m. The optical carrier from laser 100 is amplitude modulated by a modulator 105 which may comprise a gallium arsenide or a cadmium telluride crystal located inside or outside the cavity of laser 100. The modulator 105 is in turn controlled by a voltage applied thereacross by a modulator control circuit 104 which has as its inputs a plurality of signals from a modulating signal source 106 on lines 106A and a multiplexer control circuit 103 on a line 103A. Modulator control circuit 104 may comprise any wellknown, controllable high voltage driver which amplifies the modulating signals obtained from modulating signal source 106.

Up to this point, the laser sending station 10 is well-known to the prior art, as evidenced by an article entitled "'New' Contender for Space Communications, " Mocker et al., *Laser Focus*, October, 1970, and need not be described in more detail.

Multiplexer control circuit 103 may comprise a time-division multiplexing means which establishes a repetitive communications cycle and which subdivides that communications cycle into $n$ communication periods, one for each transceiver station of the system, plus additional periods for synchronization. As is well known, multiplexer control 103 may include a clock source and a series of counters for providing timing signals to a plurality of gates for switching various signal outputs provided by circuit 106 to the driver portion of modulator control 104.

Figure 5:
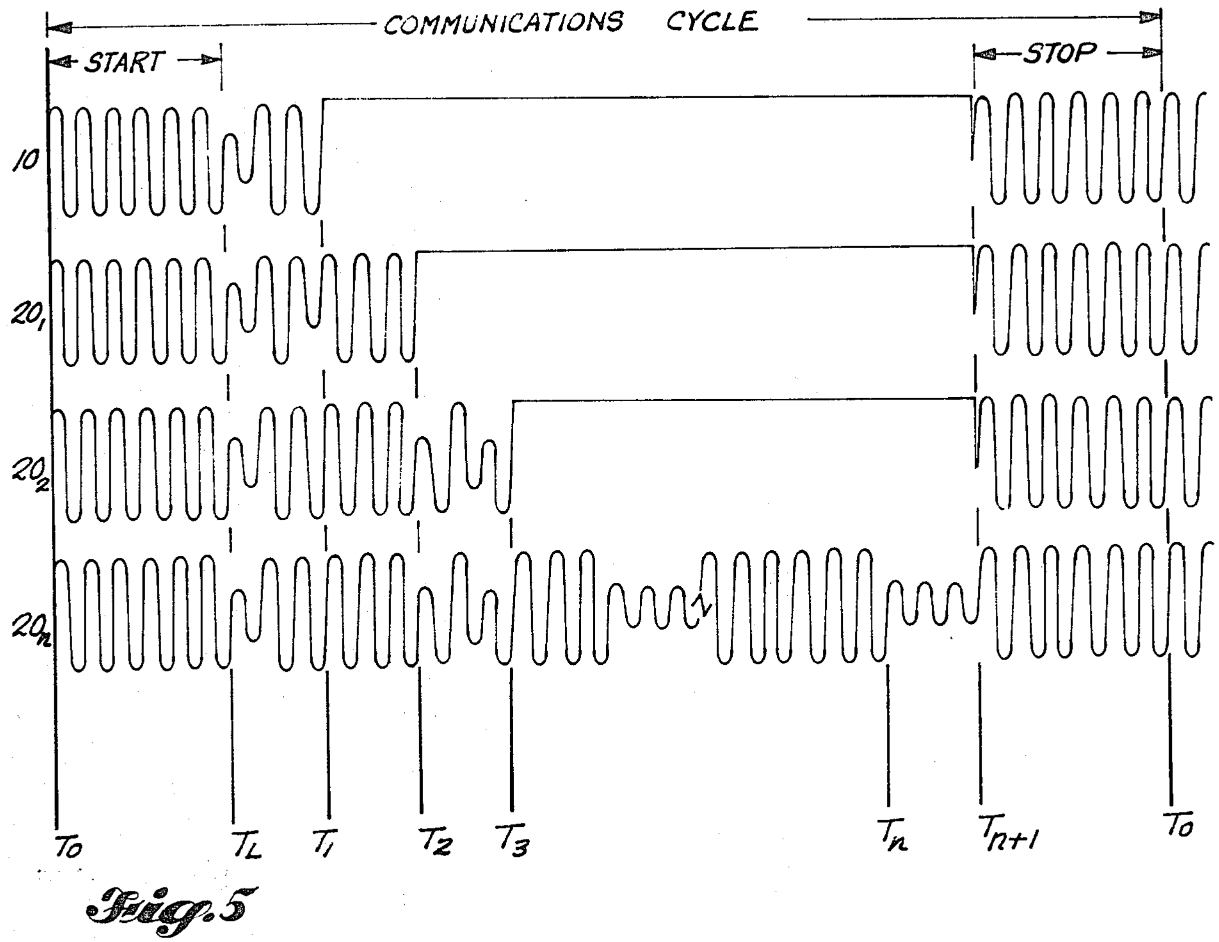
FIG. 5 is a timing diagram illustrating the waveforms obtained in one communications cycle of the closed-loop communications system in FIG. 1; and, FIG. 6 is a timing chart illustrating the response of the optical detectors and modulator of the present invention to an incident laser-originated coherent light pulse.

With reference now to FIG. 5, the output from modulator 105 (which is the output from laser sending station 101 is illustrated at the top of the figure. For the first period within the communications cycle, that is, from times $T_0$ to $T_L$, multiplexer control 103 provides an output signal on line 103A to modulator control 104 so that a fixed-amplitude signal from signal source 106 is amplitude modulated on the optical carrier L. This initial period of fixed amplitude modulation is used as a start signal for synchronization of all the transceivers $20_1$, $20_2$ . . . $20_n$, and receiver 30. In addition, multiplexer control 103 receives a signal on line 103B from receiver 30 so that a particular communications cycle may be synchronized with the immediately preceding communications period, as hereinafter described.

During the first communications period within the communications cycle, that is, from times $T_L$ to $T_1$, multiplexer control 103 provides a signal on line 103A to cause modulator control 104 to apply an information signal from modulating signal source 106 across modulator 105. As a result, the optical carrier L is amplitude modulated with the information signal for the period $T_L$–$T_1$. The specific information that has been modulated onto optical carrier L during this period is that to be transmitted to transceiver $20_1$. For most of the remainder of the communications cycle, that is, from $T_1$ to $T_{n+1}$, multiplexer control 103 turns off or inhibits the operation of modulator control 104 so that the optical carrier L is unmodulated and comprises a DC signal as illustrated in FIG. 5.

In this multiplexing scheme, the first communication period is used for encoding information from the laser sending station 10 onto the optical carrier L, and, as will be seen, each of the remaining periods are used for encoding information from a particular transceiver onto the optical carrier L.

At time $T_{n+1}$, which occurs at the termination of the communications period for transceiver $20_n$, multiplexer control 103 again causes modulator control 104 to apply a fixed amplitude signal from modulating signal source 106. Therefore, a second synchronizing or stop signal is modulated on the optical carrier L. At $T_o$, this modulation terminates and the communications cycle is repeated.

Figure 3:
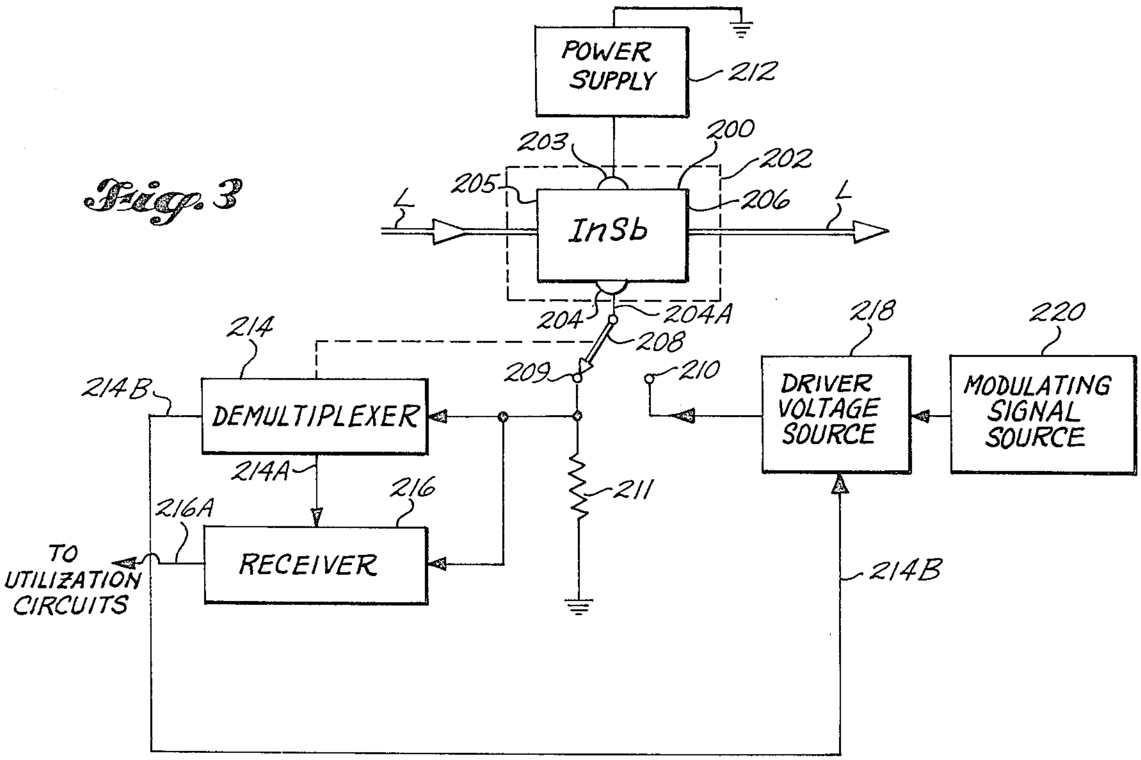
FIG. 3 is a block diagram of one embodiment of each of the transceivers in FIG. 1, each transceiver including the optical detector and modulator of the present invention.
Figure 4:
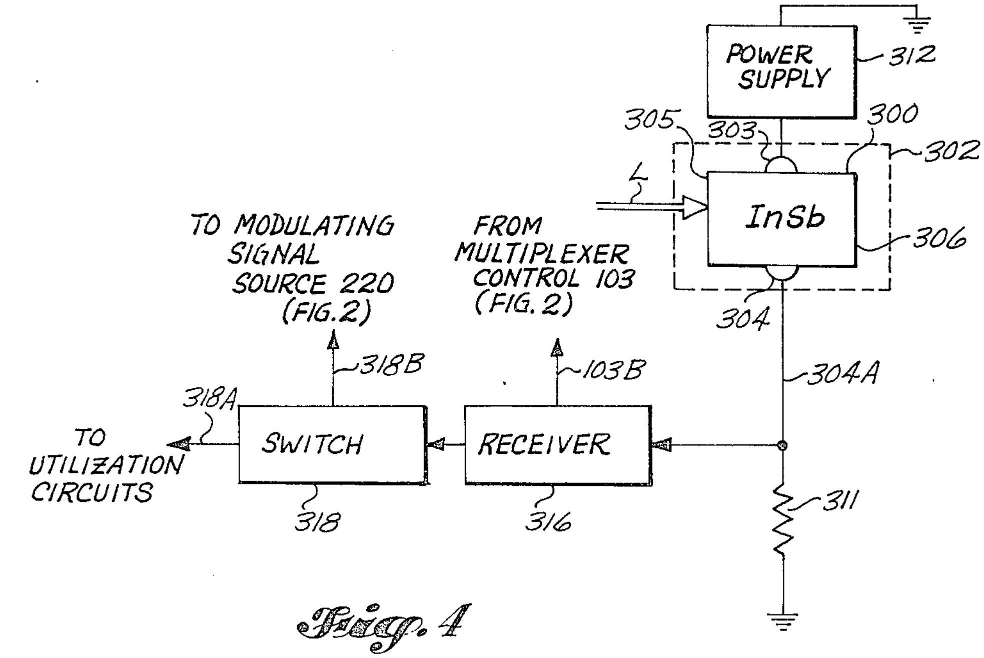
FIG. 4 is a block diagram of a receiver in FIG. 1 associated with the laser sending station.

With reference now to FIG. 3, the modulated optical carrier L is received at the transceiver and is directed upon one surface 205 of a semiconductor block 200.

The block 200 comprises a narrow-gap semiconductor material which is capable of producing stable, repeatable electronhole plasmas when irradiated by a relatively high intensity, coherent light beam having a predetermined wavelength, in the absence of external electric or magnetic fields. The phenomenon explaining the formation of the electron-hole plasma is commonly known as the "two-photon" or "multi-photon" absorption effect. Such plasmas, which result in an excess carrier conductivity $\sigma_{ex}(t)$ within the block 200, are known to occur in p-type or n-type indium antimonide (InSb) which is maintained at cryogenic temperatures, that is, below 150° K, and irradiated by light from a $CO_2$ laser having a wavelength of 9.6$\mu$m or 10.6$\mu$m. Further details on the properties and formation of these plasmas in InSb are given in a paper entitled "Multiphoton Injected Plasmas in InSb", Slusher et al., *Physical Review*, No. 3, July 15, 1969, p. 183, which is fully incorporated by reference herein.

Preferably, the block 200 of p-type or n-type InSb, which may be /mm$^3$ in volume, is maintained in a controlled temperature environment 202 at a particular temperature within the range indicated. A preferred temperature for InSb is 77° K, which is obtained by immersing the block 200 in liquid nitrogen. The block 200 is provided with two ohmic contacts 203 and 204. In one example, the contact material comprised indium containing one percent tellurium which was alloyed on the block 200.

Terminal 203 is connected to a biasing means including one side of a low voltage power supply 212 whose other side is at reference potential. The other terminal 204 is connected via a lead 204A to a switching means 208 which may comprise a relay or solid state switch represented by a movable contact arm normally connected to a stationary contact 209, and movable out of engagement with stationary contact 209 and into engagement with a stationary contact 210 upon an appropriate signal from a demultiplexer circuit 214. In the normal position illustrated in FIG. 3, the block 200 is connected in circuit with a detecting means including a resistor 211 which is connected to reference potential.

The voltage provided by voltage supply 212 is typically a low voltage, in the order of 1–10 volts, which provides a bias across block 200 so that the excess conductivity resulting from the multiphoton injected plasma may be converted into a corresponding voltage signal across resistor 211.

Figure 6:
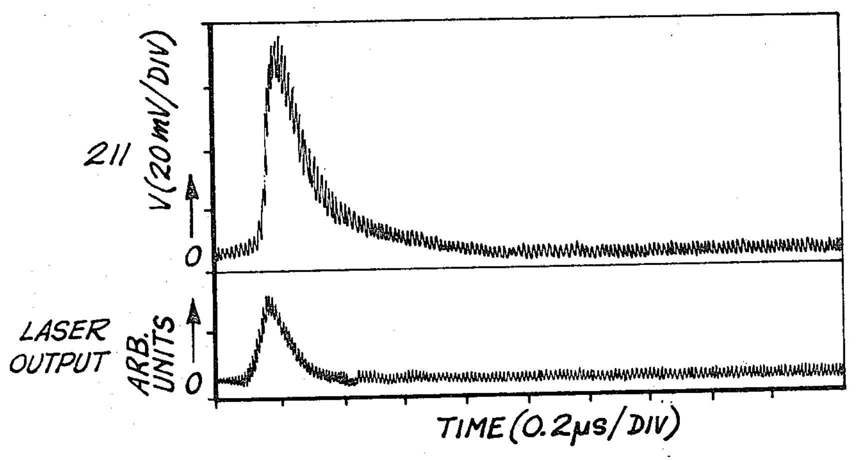

The fact that this circuit provides a very fast detection of the modulated optical carrier L is illustrated in FIG. 6, which shows the time response of the voltage across resistor 211 with the application of a laser pulse obtained from a $CO_2$ laser. The lower graph in FIG. 6 was obtained by monitoring the light output of a pulsed $CO_2$ laser with a high speed, gold-doped germanium detector which was cooled to 77° K, and the upper graph in FIG. 6 illustrates the voltage signal obtained across resistor 211. It can be readily seen that the voltage across resistor 211 faithfully reproduces the amplitude and time dependence of the laser pulse.

Referring now back to FIG. 3, the voltage across resistor 211 is coupled to both a demultiplexer 214 and to a receiver 216. The demultiplexer 214, in conventional fashion, may include a counter and suitable gating circuits. Upon detection of the fixed amplitude modulation comprising the stop signal in each communications cycle, the counter and all gating circuits within demultiplexer 214 are reset. Upon detection of the fixed amplitude modulation comprising the start signal in the succeeding communications cycle, the counter is enabled and thereafter is driven either by an internal clock or by a clock signal derived from the carrier frequency of the optical carrier L. When the counter increments to a fixed number defining the start of the first communications period, a first output signal is provided to the gating circuits which supply an enabling signal on a line 214A to turn on receiver 216.

Thereafter, during that first communications period, the voltage across resistor 211, which corresponds to the modulation placed on the optical carrier L at the laser sending station 10, is demodulated, and supplied on a line 216A to utilization circuits not illustrated.

When the counter increments to a second fixed number defining the termination of the initial communications period, a second output signal is provided to the gating circuits which terminates the signal on line 214A and therefore disables receiver 216.

When the counter increments to a third fixed number defining the start of the communications period for the associated transceiver, a third output signal is provided by the counter so that the switching means 208 is actuated to switch the movable contact arm into engagement with stationary contact 210. At this time, the circuit is enabled to modulate the optical carrier L to transmit information from the associated transceiver to the remaining stations in the system.

When the unmodulated optical carrier L is received at the transceiver, for example, at transceiver 20, during that portion of the communications cycle following the $T_1$, there is little or no bias voltage across the block 200 and therefore when the electric field strength within the block 200 is small or zero, the block 200 is essentially optically transparent, except for the small losses resulting from the creation of the previously described multiphoton absorption plasma. These losses, which are commonly referred to as arising from "free-hole absorption", are typically 2% or less of the total energy of the impinging optical carrier L. Therefore, the optical carrier L exits from the block 200 at surface 206 only slightly attenuated and is thereafter directed to the next station as previously described. The holes produced by the optical carrier L by photon absorption decay very rapidly as shown in FIG. 6.

Amplitude modulation of the optical carrier L by the transceivers $20_1$, $20_2$ . . . $20_n$ during each communications period is effected by producing "free-hole" absorption again, but by another, controllable means, namely, producing holes in a second plasma. This second plasma is produced either by injection or impact ionization in the block 200. Both the magnitude and time dependence of the plasma can be controlled to produce a modulated, information signal for further transmission along the loop. These methods of producing a plasma in the block 200 make it possible to accurately control the optical transparency of the block 200. It has been shown that this optical transparency is related to the excess carrier conductivity $\sigma_{ex}(t)$ in the block 200 when created by an injected or impact-ionized plasma under influence of an applied external electric field.

In my copending patent application U.S. Ser. No. 290,993, entitled "Radiant Energy Optical Detector Amplifier," which is also assigned to the assignee of the present invention now U.S. Pat. No. 3,795,803, I describe in detail the properties and formation of plasmas created by electron-hole injection and also resulting from impact ionization after electron-hole injection. The aforementioned copending patent application is fully incorporated by reference herein.

In short, the value of excess carrier conductivity $\sigma_{ex}(t)$ that is obtained in the block 200 is related to the value of the average applied electric field $E$. Since $E$ is the voltage between contacts 203 and 204, divided by the distance between them, the field $E$ is controlled by the value of the voltage applied across the bock 200. For p-type InSb, plasmas created by electron-hole injection occur with applied fields of a few volts/cm up to and beyond 300 volts/cm. The density of the injected plasma and therefore the number of free holes available for absorption depends on the amplitude of the applied field. With average applied fields in the range of 300 volts/cm to 1200 volts/cm, plasmas result from impact ionization, in both p-type and n-type InSb. In such a case, the plasma is very dense and thus the amplitude modulation is very large.

Therefore, by controlling the magnitude and the time dependence of the voltage applied across block 200, the optical transparency of the block 200 can be varied in direct response thereto so as to modulate the optical carrier L. In FIG. 3, the information to be transmitted from the associated transceiver is provided in an information signal from a modulating signal source 220 which is supplied to a driver voltage source 218 which comprises an amplifier. During the initial communications period, a signal on line 214B from demultiplexer 214 inhibits driver voltage source 218. At the termination of this initial period, the gating circuits within demultiplexer 214 respond to the third output signal from the counter therein and supply an enabling signal on line 214B. Thereafter, an output voltage related in magnitude and time to the information signal provided by modulating signal source 220 is applied across the block 200 via switch 208 and contacts 203, 204. The modulated optical carrier L exists from the block 200 at surface 206 and is directed to the next station.

When the counter within demultiplexer 214 increments to a fourth fixed number defining the termination of the communications period for the associated transceiver, a fourth output signal is provided to the gating circuits which in turn terminate the enabling signal on line 214B and therefore, terminate the modulation.

The results of the modulation for the transceivers $\mathbf{20}_1$, $\mathbf{20}_2$ and $\mathbf{20}_n$ are seen in the second, third, and fourth lines of FIG. 5 in which, during the communications period assigned to each transceiver, the previously unmodulated optical carrier L is amplitude-modulated with a desired information signal.

Accordingly, each of the transceivers $\mathbf{20}_1$, $\mathbf{20}_2$ . . . $\mathbf{20}_n$ sequentially receives and transmits information on the single optical carrier L during each communications cycle. The gating circuits within the demultiplexer 214 in each transceiver may be designed so that a particular transceiver may receive any portion of any communications period and then transmit during its assigned communications period in the communications cycle.

Synchronization of the system and retransmission of the information is achieved by the receiver 30 operating with laser sending station 10. Now turning to FIG. 4, a narrow-gap semiconductor, such as InSb, is provided in a block 300 which is irradiated with the modulated optical carrier L transmitted from the transceiver $\mathbf{20}_n$. The block 300 is maintained at a given temperature, such as 77° K, in a controlled temperature environment 302 identical to environment 202. Contacts 303 and 304 are provided with contact 303 being connected to a low voltage power supply 312 which also establishes a reference potential, and contact 304 being connected via a lead 304A to a detecting network including a resistor 311. As before, the multiphoton injected plasma, in block 300, and the resultant excess carrier conductivity $\sigma_{ex}(t)$ is detected as a voltage across resistor 311 and supplied to a receiver 316 wherein it is demodulated. Receiver 316 is continuously energized and functions to supply the start and stop signals in the received optical carrier L via line 103B to multiplexer control 103 to synnchronize the production of similar signals during a succeeding communications cycle and to supply the information signals in each communications cycle to a switch 318. Control circuitry is provided for switch 318 so that certain of the demodulated information signals are routed to a lead 318A and thence to utilization circuits associated with laser sending station 10. In addition, switch 318 routes certain of the demodulated information signals to modulating signal source 220 so that these signals are available for retransmission during a succeeding communications cycle by operation of the system as previously described. Retransmission may be desired in the case where a particular transceiver desires to communicate with a transceiver through which the optical carrier L has previously passed during a communications cycle.

While the invention has been described with respect to a system using an optical carrier L produced by a carbon dioxide laser, at specified frequencies of 9.6μm or 10.6μm, and additionally using a block of semiconductor material comprising p-type or n-type InSb which is maintained below 150° K, it is clear that the invention is not limited thereto. What is important is that the block of semiconductor material used as the detector and modulator have a narrow energy-gap between its valence and conduction bands, with that energy gap being matched to the properties of the optical carrier L such that (a) a first plasma can be produced in the block due to irradiation by multiphoton absorption, and (b) a second plasma may be produced in the block by electron-hole injection, or impact ionization, due to the application of an external electric field exceeding a predetermined minimum value. Techniques for control of the energy gap of a narrow gap semiconductor material are well known to the art and include, among others, the maintaining of the block at cryogenic temperatures, such as used with InSb in the present example, or, the addition of alloys to the basic block semiconductor material.

In such a closed loop system, it is desirable that the optical carrier L be produced by a laser, inasmuch as the necessary intensities for creation of a plasma produced by multiphoton absorption are not easily realized by other light sources. In addition, the narrow beam of the laser makes it ideal for longdistance communications. A carbon dioxide laser, however, is not considered necessary and is mentioned only in that the particular wavelength output of the carbon dioxide laser is of the right value to produce the multiphoton absorption effect in p-type or n-type InSb. Therefore, other combinations of sources of the optical carrier L, and semiconductor material for the detector modulating blocks, can be used in the present invention, whose limits are to be determined only by those of the appended claims.

I claim:

1. A detector-modulator for an optical communications system comprising:

a. a narrow energy-gap semiconductor means capable of producing an electron-hole plasma by multiphoton absorption in response to irradiation by a modulated coherent optical carrier having a predetermined wavelength;

b. a biasing circuit means connected to said semiconductor means resulting from said plasma to provide an output signal proportional to the modulation of said coherent optical carrier; and, c. a modulating voltage means connected to said semiconductor means to apply a modulating voltage across said semiconductor means in response to a modulating signal to accordingly create a second plasma in said semiconductor means which modulates said coherent optical carrier by free-hole absorption thereof.

2. A detector-modulator as recited in claim 1, wherein said semiconductor means comprises indium antimonide which is capable of producing said plasma when maintained at a temperature in a predetermined range of temperatures, and further comprising means maintaining said semiconductor means at one of said temperatures in said range.

3. A detector-modulator as recited in claim 1, wherein said biasing circuit means includes a power supply having first and second terminals, the potential on said first terminal serving as a reference potential and the potential on said second terminal bein coupled to said semiconductor means, and resistance means having one side connected to said semiconductor means and a second side connected to said reference potential.

4. A detector-modulator as recited in claim 3, wherein said modulating voltage means includes an amplifier producing a voltage across said semiconductor means having a magnitude sufficient to produce said second plasma by electron-hole injection.

5. A detector-modulator as recited in claim 4, wherein said amplifier produces a voltage having a magnitude sufficient to produce said plasma by impact ionization.

6. An optical communications system comprising:

a. a first transceiver means including a source of a modulated coherent optical carrier having a predetermined wavelength; and b. a second transceiver means including a narrow energy-gap semiconductor means capable of producing an electron-hole plasma by multiphoton absorption in response to irradiation by said coherent optical carrier and a biasing circuit means for detecting excess conductivity in said semiconductor means resulting from said plasma to provide an output signal in proportion to the modulation of said carrier.

7. An optical communications system as recited in claim 6, wherein said source of a modulated coherent optical carrier comprises a carbon dioxide laser, and said semiconductor means comprises indium antimonide.

8. An optical communication system comprising:

a. a first transceiver means including a source of a modulated coherent optical carrier having a predetermined wavelength;

b. a second transceiver means including a narrow energy-gap semiconductor means capable of producing an electron-hole plasma by multiphoton absorption in response to irradiation by said coherent optical carrier and a biasing circuit means for detecting excess conductivity in said semiconductor means resulting from said plasma to provide an output signal in proportion to the modulation of said carrier;

c. said first transceiver means additionally including a second narrow energy-gap semiconductor means capable of producing an electron-hole plasma by multiphoton absorption in response to irradiation by modulated coherent optical carrier having a predetermined wavelength, and biasing circuit means for detecting excess conductivity in said second semiconductor means resulting from said plasma to provide an output signal proportional to the modulation of said coherent optical carrier;

d. said second transceiver means also including a modulating voltage means to apply a modulating voltage across said semiconductor means in response to a modulating signal to accordingly create the second plasma in said semiconductor means which modulates said coherent optical carrier by free-hole absorption thereof; and, e. each of said first and second transceiver means includes means for reflecting the coherent optical carrier which has been detected and modulated by that transceiver means back to said other transceiver means.

9. An optical communications system as recited in claim 8, further comprising a plurality of said second transceiver means arranged in a closed-loop communication system with said first transceiver means, wherein a first of said plurality of second transceiver means detects the modulated optical carrier transmitted by said first transceiver means, wherein each of the succeeding ones of said plurality of second transceiver means detects and modulates the coherent optical carrier transmitted by a preceding one of said plurality of second transceiver means, and wherein said first transceiver means detects and modulates the coherent optical carrier provided by a last one of said plurality of second transceiver means.

10. An optical communications system as claimed in claim 9, further comprising multiplexing means establishing a communication cycle including a plurality of communication periods, one for said first transceiver means and for each of said plurality of second transceiver means, and wherein said first transceiver means and each of said plurality of second transceiver means includes means responsive to said multiplexing means for enabling said source of a modulated coherent optical carrier, and said modulating voltage means, respectively, only during the assigned communication period for said transceiver means.

* * * * *